Oct. 1, 1968  L. S. JAWORSKI  3,403,437
METHOD OF MAKING A NUT IMPRESSION TO EFFECT A
LIQUID-TIGHT SEAL WITH A SCREW
Original Filed Dec. 10, 1965
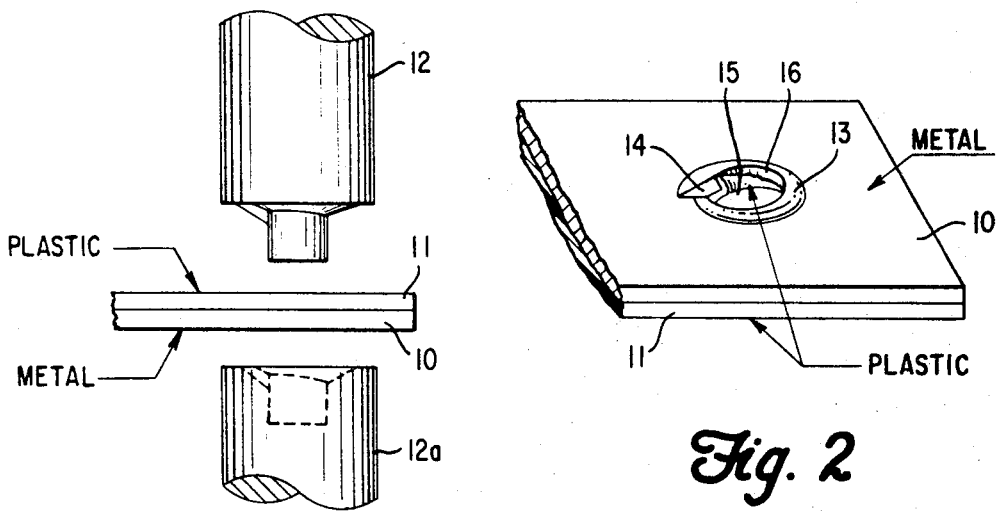
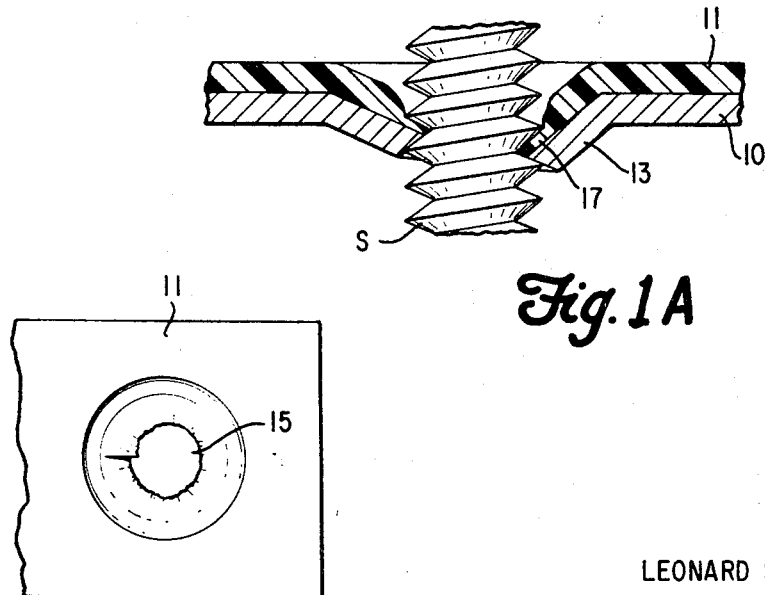
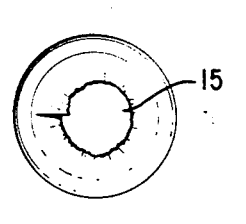
INVENTOR.
LEONARD S. JAWORSKI
BY
ATTORNEYS 3,403,437
METHOD OF MAKING A NUT IMPRESSION TO EFFECT A LIQUID-TIGHT SEAL WITH A SCREW
Leonard S. Jaworski, Toledo, Ohio, assignor to The Bishop and Babcock Corporation, Toledo, Ohio, a corporation of Ohio
Original application Dec. 10, 1965, Ser. No. 513,021, now Patent No. 3,353,436, dated Nov. 21, 1967. Divided and this application Jan. 9, 1967, Ser. No. 607,998
1 Claim. (Cl. 29—481)

ABSTRACT OF THE DISCLOSURE

This invention relates to a method of forming a sheet metal nut impression which is adapted to form with a screw applied thereto a liquid-tight seal and is concerned with the application of a plastic material to the sheet metal, then forming the nut impression in such manner that the plastic material is freed from the sheet metal at the edge of the opening in the nut impression and is squeezed between the nut impression and the threads of an inserted screw.

*Cross-reference to related application*

This application constitutes a division of my application Ser. No. 513,021, filed December 10, 1965, now Patent No. 3,353,436, granted November 21, 1967, and entitled, "Sheet Metal Screw-Receiving Fastener and Method of Making Same."

*Background of the invention*

The field of the invention is in respect of the manufacture of nut impressions from sheet metal in which the metal is pressed into the desired shape and punched to afford a screw-receiving hole. Prior art references include the following:

2,169,056, Aug. 8, 1939, B. C. Place; 2,366,114, Dec. 26, 1944, H. W. Kost; 2,383,133, Aug. 21, 1945, H. W. Kost; 2,831,388, April 22, 1958, C. W. Collins, et al.

These references are not concerned with the effecting of a liquid-tight seal with respect to the applied screw. However, some prior art of general interest in this respect are as follows:

2,417,263, March 11, 1947, Morehouse; 2,851,079, Sept. 9, 1958, Heller; 2,904,820, Sept. 22, 1959, Flora.

These prior art devices do not afford the desired seal so far as a simple nut impression is concerned where the sheet metal has a plastic coating to achieve the result.

*Summary of the invention*

In applying a screw to a nut impression formed in sheet metal difficulty is encountered in effecting a liquid-tight seal because of the metal to metal contact and the clearances normally provided in such structures. This invention provides a simple method of providing such seal during the formation of the nut impression. This is achieved by bonding a non-metallic flexible and resilient plastic material to one side of the sheet and by appropriate punch and die parts, shaping the metal to form the nut impression. The punch attacks the plastic-coated side of the sheet metal and in the formation of the nut impression breaks a portion of the bond of the plastic material in the area of the hole in the nut impression. As a consequence when a screw is applied to the nut impression, the plastic material is squeezed and stretched by the screw threads to effect the desired liquid-tight seal.

FIGURE 1 is a side elevation of a sheet metal piece to which is bonded a layer of non-metallic plastic and showing diagrammatically associated therewith a pair of dies for forming a screw-receiving fastener with the male die intended for initial penetration of the plastic layer;

FIGURE 1A is an enlarged sectional view of the fastener with a screw applied thereto and showing the sealing engagement between the plastic layer and the screw threads;

FIGURE 2 is a top perspective view of the screw-receiving fastener viewed from the sheet metal side and showing the manner in which the plastic layer has been forced inside the protuberance and in the region of the helical thread; and FIGURE 3 is a bottom plan view of the fastener.

The illustrated embodiment of the invention comprises a sheet metal piece 10 to which is adhered in any suitable manner a layer 11 of non-metallic plastic material. The layer 10 must have characteristics of flexibility and resilience and be moisture resistant. A suitable plastic for this purpose is vinyl or polyethylene and it should have appreciable thickness and not merely be a thin coating. Although considerable variation in thickness may be had, it should be in excess of one-half the thickness of the sheet metal piece and may indeed be considerably greater than the sheet metal thickness. The adhesion between the plastic and metal should be of sufficient tenacity that the metal can be shaped into various fastener forms, such as U and J forms, without destroying the bond. However, the adhesion should not be such that in the formation of the screw-receiving impression, a portion cannot be broken away so as to effect a moisture-tight seal as will hereinafter be pointed out.

A pair of dies 12 and 12a is illustrated with the punch or male die shown in position initially to engage the plastic layer 11. In this instance a single pair of dies is shown to accomplish pressing a portion of the metal to form a protuberance 13, slitting the metal radially as at 14, punching to form a central hole 15 and shaping the edge of the hole from one side of the slit to the other to form a helix, as at 16, for screw thread engagement. These steps may be accomplished in a single step or progressively in a series of steps but since this is old in the art, further description is not considered necessary.

With respect to this invention, it is important that the male die first engage the plastic layer 11 before the metal sheet. Thus when the nut impression is formed, the plastic material in that region is punched along with the metal to afford registering screw-receiving holes and radial slits. When the metal is pressed outwardly to form the protuberance 13, it appears that at the high side of the helix 16, the adhesion between the plastic and metal is unimpaired. However such adhesion does not prevail throughout the impression because from the high side of the helix down to the low side of the helix close to the hole edge, the plastic is freed of its bond to the metal 10. Likewise a certain thinning or stretching of the plastic takes place in the region adjacent the hole 15, as indicated at 17 on FIGURE 1A. This is to advantage when a screw S is applied enabling a portion of the plastic including the thinned edge portion 17 to become completely interposed between the threads of the screw and the helix 16 of the impression and, as the screw is tightened, the plastic material between the threads is compressed or deformed. This creates a moisture-tight seal between the screw S and the nut impression and militates against the passage of water from one side of the panel to the other side. Upon removal of the screw S from the nut impression, the resilience of the plastic is such that it will return to its normal condition, thus making possible repeated application of the screw S without loss of the moisture seal.

Numerous changes in details of construction and choice of material may be effected without departing from the spirit of the invention, especially as defined in the appended claims.

What I claim is:

1. The method of making a nut impression adapted to form with a screw applied thereto a liquid-tight seal, said method consisting in providing a relatively flat sheet metal piece, bonding to one side of said sheet metal piece a layer of non-metallic, flexible and resilient plastic material of appreciable thickness, pressing against the plastic layer side of said sheet metal piece to form a protuberance projecting outwardly from the sheet metal side, forming a central hole in the protuberance, radially slitting said protuberance, and shaping the wall of said hole into helical form, the bond between said plastic layer being such that in the formation of the nut impression, the plastic layer in the region of helix adjacent the edge of the hole is freed.

References Cited

UNITED STATES PATENTS

| 2,169,056 | 8/1939 | Place | 113—116 |
| 2,434,844 | 1/1948 | Flora. | |
| 2,366,114 | 12/1944 | Kost | 113—116 |
| 2,383,133 | 8/1945 | Kost | 113—116 |
| 3,108,371 | 10/1963 | Munse | 113—116 |

FOREIGN PATENTS 764,177  12/1956  Great Britain.

JOHN F. CAMPBELL, *Primary Examiner.*

PAUL M. COHEN, *Assistant Examiner.*